(12) United States Patent
Ingram

(10) Patent No.: US 6,509,836 B1
(45) Date of Patent: Jan. 21, 2003

(54) SMART REFLECTION ANTENNA SYSTEM AND METHOD

(75) Inventor: Mary A. Ingram, Decatur, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/824,317

(22) Filed: Apr. 2, 2001

Related U.S. Application Data

(60) Provisional application No. 60/193,829, filed on Mar. 31, 2000.

(51) Int. Cl.[7] ............................................. G08B 13/14
(52) U.S. Cl. ................................. 340/572.4; 340/572.7
(58) Field of Search ......................... 340/572.4, 572.7, 340/572.8, 573.1, 10.1, 10.2, 10.3, 10.42, 10.6; 342/42, 44, 51, 367; 455/277.1, 100, 101; 343/850, 872; 310/313 R

(56) References Cited

U.S. PATENT DOCUMENTS

| | | | | |
|---|---|---|---|---|
| 5,526,357 A | * | 6/1996 | Jandrell | 340/991 |
| 5,686,902 A | * | 11/1997 | Reis et al. | 340/10.6 |
| 5,748,669 A | * | 5/1998 | Yada | 455/101 |
| 5,914,671 A | * | 6/1999 | Tuttle | 340/10.6 |
| 6,236,315 B1 | * | 5/2001 | Helms et al. | 340/572.7 |
| 6,289,209 B1 | * | 9/2001 | Wood, Jr. | 455/277.1 |

OTHER PUBLICATIONS

"A Low–Cost Radio for an Electronic Price Label System" by Bells Labs Technical Journal, dated Autumn 1996, pp. 203–215.

Design of a Planar Array Transponder with Broad Responding Beam; by Hung–Tu Chen and Shyh–Jong Chung, IEEE Microwave and Guided Wave Letters, vol. 7, No. 9, Sep. 1997, pp. 197–299.

Traditional and Emerging Technologies and Applications in the Radio Frequency Identification (RFID) Industry, by John R. Tuttle, Micron Communications, Inc., 9/97 IEEE Radio Frequency Integrated Circuits Symposium, pp. 5–8.

"Space–Time Processing for Wireless Communications" by Paulraj and Papadias, Nov. 1997, IEE Signal Processing Magazine, pp. 49–83.

"Integrated Circuit Array Antenna for Short–Range Communication Systems", by F. Carrez and J. Vindevoghel, Electronics Letters, Jul. 09, 1998, vol. 34, No. 14, pp. 1370–1371.

"A Low–Cost Two–Way Radio Transceiver" by Evans, Shober, Vannucci, Wilkus and Wright, Lucent Tech. 8/98 © IEEE, pp. 301–303.

(List continued on next page.)

Primary Examiner—Van Trieu
(74) Attorney, Agent, or Firm—Thomas, Kayden, Horstemeyer & Risley, LLP

(57) ABSTRACT

A smart reflection antenna system and method are disclosed. In this regard, a representative embodiment of a smart reflection antenna system includes an interrogator transmitter (IT) having an IT array of at least two antennas, the IT being configured to simultaneously transmit a carrier signal from multiple antennas of the IT array. The system also includes a tag having a tag array of at least one antenna. The tag being configured to simultaneously receive the carrier signal from the IT array via the tag array, modulate the carrier signal into a modulated carrier signal; and simultaneously transmit the modulated carrier signal via the tag array. The system also includes an interrogator receiver (IR) having an IR array of at least two antennas, the IR being configured to simultaneously receive the modulated carrier signal from the tag array via multiple antennas of the IR array. Other embodiments of systems and methods are disclosed.

32 Claims, 10 Drawing Sheets

OTHER PUBLICATIONS

"Ka–Band Beam Steering Reflectarray Study" by McSpadden, Fan, and Chang, Texas A&M University, 0/99 © IEEE, pp. 1662–1665.

"Radio Frequency Identification RFID" by AIM International, Inc.; No. WP–98/002R, version 1.1, dated Jul. 24, 1998, pp. 1–16.

Radio Frequency Identification (RFID): Applications to Re–Use and Recycle Computers and Other Products, by Neckel, Princeton Summer Institute 98, www.princeton.edu/~ vmthomas/wolfgang.html, 10 pages.

"An Overview of Back Scattered Radio Frequency Identification System (RFID)" by K.V.S. Rao, Intermec Technologies Corporation, 1999 IEEE, dated Feb. 1999, pp. 746–749.

Joint Transmit and Receive Optimization for High Data Rate Wireless Communication Using Multiple Antennas by Sampath and Paulraj; Stanford University, 0/99 © 1999 IEEE, pp. 215–219.

"An Active Tagging System Using Circular–Polarization Modulation" by Marcel A. Kossel, Roland Kung, Hansruedi Benedickter and Werner Bachtold, IEE Transactions on Microwave Theory and Techniques, vol. 47, No. 12, Dec. 1999, pp. 2242–2248.

"RFID for Road Tolling, Road–Use Pricing and Vehicle Access Control" by Phil Blythe, Senior Lecturer in Transport Telematics © 1999 The Institution of Electrical Engineers, pp. 8/1–8/16.

"An Active Integrated Retrodirective Transponder for Remote Information Retrieval" by Ryan Y. Miyamoto, Youngxi Qian and Tatsuo Itoh; 2000 IEEE, pp. 194–197.

"Active Retrodirective Array for Remote Tagging and Wireless Sensor Applications", by Miyamoto, Qian, Itoh, Paper TH2A–7, 2000 IEEE MTT–S Digest, pp. 1431–1434.

"An Intelligent 2.45 GHz Beam–Scanning Array for Modern RFID Reader" by Slonen, Keskilammi, Sydanheimo, Kivikoski; Tampere University of Technology, Finland 2000 IEEE, pp. 407–410.

"Effects of Iterative Detection and Decoding on the Performance of BLAST" by Li, Huang, Foschini, and Valenzuela, Bell Labs, Lucent Tech. 01/00 © 2000 IEEE, pp. 1061–1066.

"Microwave Backscatter Modulation Systems" by Kossel, et al., Swiss Federal Institute of Technology (ETH) Zurich, pp. 1427–1430.

"Smart Antenna" by Georgia Institute of Technology, pp. 1 and 2, Update Apr. 26, 2000, by Kuo–Hui Li http://users.ece.gatech.edu/~mai/tutorial_sa_def.htm.

"Smart Antenna Would Create Wireless Homes", by American Business Journals Inc., dated Sep. 11, 2000, 3 pages, http://www.bizjournals.com/atlanta/stories/2000/02/21/focus16.html.

"Modulated Backscatter: Measurements and Diversity Configurations" by Mary Ann Ingram and Daeyoung Kim, dated Jan. 25, 2001, pp. 1–15 and 1–18.

"Range Extension for Systems Using Modulated Backscatter" A White Paper, by Mary Ann Ingram, School of ECE, Georgia Tech, undated, 2 pages.

Small–scale Fading for an Indoor Wireless Channel with Modulated Backscatter, by Daeyoung Kim, Mary Ann Ingram and Whit Smith, undated, pp. 1 and 2.

Article "What are Transponders" by Transponders news—What is RFID—What are Transponders, 2 pages; dated Mar. 09, 2001, htp://www.rapidttp.com/transponder/rfid-basi.html.

Article "EAS Systems" EAS and trolley scanning systems, 5 pages; dated Mar. 09, 2001, http://www.rapidttp.com/transponder/easbasic.html.

Article "Magnetic coupled transponder systems" EAS and trolley scanning systems, 1 page, dated Mar. 09, 2001, www.rapidttp.com/transponder/magnetic.html.

Article "Electric coupled transponder systems" EAS and trolley scanning systems, 2 pages, dated Mar. 09, 2001 www.rapidttp.com/transponder/electric.html.

Article "Multiple article scanning" EAS and trolley scanning systems, 2 pages, dated Mar. 09, 2001, www.rapidttp.com/transponder/multitag.html.

Article "Single bit/read only/ read–write,smartcards and RFDC" EAS and trolley scanning systems, 2 pages dated Mar. 09, 2001, www.rapidttp.com/transponder/readwrit.html.

Article "Unusual applications" EAS and trolley scanning systems, 1 page, dated Mar. 09, 2001, www.rapidttp.com/transponder/unusual.html.

Article "How RFID systems work" Transponder news—How RFID systems work—Independent reports on radio frequency iden . . . 1 page, dated Mar. 09, 2001, www.rapidttp.com/transponder/newswork.html.

Article "Trolley Scan (Pty) Ltd" Trolleyponder®/EcoTag ™ RFID technology, undated, 15 pages, www.trolleyscan.co.za/brochure/index.html.

Article "Current trends in transponder systems" Transponder News—Current trends in RFID systems, 3 pages, dated Mar. 09, 2001, www.rapidttp.com/transponder/trends.html.

Article "Future trends in transponder systems" Transponder News—Future trends in RFID systems, 3 pages, dated Mar. 09, 2001, www.rapidttp.com/transponder/trendfut.html.

Article "Wireless technology: What is RFID" PNNL Backgrounders, 2 pages, dated Mar. 09, 2001, www.pnl.gov/news/back/wirelessoverview.htm.

Article "Wave II" Wireless Solution, 5 pages, dated May, 02, 2001, www.waveid.com/semipassive.html.

Results of INSP Search and Patent Search on USPTO.gov, 10 pages, undated.

Draft Paper on the Characteristics of RFID–Systems, dated Jul. 2000, by AIM Frequency Forums, AIM FF 2000:001, Ver. 1.0, 23 pages.

* cited by examiner

SMART REFLECTION ANTENNA SYSTEM AND METHOD

CROSS-REFERENCE TO RELATED APPLICATIONS

The application claims the benefit of U.S. Provisional Application Serial No. 60/193,829, filed on Mar. 31, 2000, and titled, "Smart Reflection Antenna System," which is incorporated by reference herein in its entirety.

FIELD OF THE INVENTION

The present invention generally relates to antennas, and in particular, to a smart reflection antenna system and method for improving the characteristics of a signal.

BACKGROUND OF THE INVENTION

Antennas are commonly used for relaying information from one point to another. FIG. 1A shows a conventional array-to-array link 81, with an uninformed transmitter. The array-to-array link 81 includes a transmitter 82 coupled to an array of transmitter antennas 21–24. The transmitter antennas 21–24 are collectively referred to as transmitter array 84. Individual transmit antennas or groups of transmit antennas 21–24 transmit independent streams of data. Additionally, the array-to-array link 81 includes a receiver 83 coupled to an array of receiver antennas 27–30. The receiver antennas 27–30 are collectively referred to as receiver array 31. In the embodiment shown by FIG. 1A, there is no communication of information regarding a channel between the transmitter array 84 and the receiver array 31. There is also no modulated backscatter of a carrier signal in the array-to-array link 81. Moreover, the transmitter antennas 21–24 and the receiver antennas 27–30 must be spaced sufficiently far apart so that the independent data streams can be recovered by the receiver array 31.

FIG. 1B shows a conventional array-to-array link 20, with an informed transmitter. The receiver array 31 communicates information about the channel between the transmitter 120 and the receiver 121 to the transmitter array 84. The information enables the transmitter 120 to set the transmitter array weights to achieve a high data rate, using the method of "water-filling". However, the communication is typically done as a wireless radio frequency (RF) transmission.

FIG. 2A shows a conventional transponder or a tag 86 that uses passive transmission. An interrogator transmitter (IT) with an antenna 85 generates a carrier signal 87, and there is no power amplifier in the tag 86. Comparatively, in a tag that uses active transmission, a RF carrier signal is generated in a tag, modulated, amplified with a power amplifier, and then delivered to an antenna port for transmission. In FIG. 2A, the carrier signal 87 falls on the tag antenna 88 and is reflected in a time-varying manner by modulating the impedance of the tag antenna 88, using a switch 110 across the terminals 92 and 93 of the tag antenna. The terminals 92 and 93 of the tag antenna 88 are switched between open and closed states, according to an impedance control signal 89, thereby conveying data by modulating the carrier signal 87 and producing a modulated carrier signal 95.

An antenna on an interrogator receiver (IR), the receiver antenna 94, detects the data from the sidebands of the modulated carrier signal 95. This tag transmission technique is called "modulated backscatter" and has the advantage of a dramatic reduction in required power because of the lack of a power amplifier, relative to the active transmitter. This technology is widely used for actively powered Radio Frequency Identification (RFID), or RF tag applications. Its major disadvantage is that the power of the sidebands received at the IR is quite weak, falling off with the square of the distance between the IT antenna 85 and the tag antenna 88, and then falling off again with the square of the distance between the tag antenna 88 and the IR antenna 94. Therefore, assuming that the IT antenna 85 and the IR antenna 94 are close in proximity, the power of the modulated carrier signal 95 decreases with the fourth power of the distance between the tag antenna 88 and the IR antenna 94. In contrast, the power of active transmitters falls off with the square of the distance between the active transmitter and a receiver. A carrier signal that is modulated backscattered also suffers larger fluctuations in multipath fading according to a product of Rician fading factors, instead of a single Rician fading factor for an active transmitter.

FIG. 2B shows that the impedance control signal 89 may be the product of a periodic square wave 90 and an information waveform 91. The information waveform 91 depends on the data stream or information that a tag is transmitting, and is usually a constant if only one bit of information is being transmitted.

Although FIG. 2A depicts an embodiment that modulate backscatters the carrier signal 87, it does not disclose improving the signal-to-noise ratio (SNR) of the modulated carrier signal 95. As for most radio applications in scattering environments, in accordance with prior art, the SNR of the modulated carrier signal may be improved by slight movements of tag antennas. FIG. 3 shows a conventional tag antenna 88 in a tag 86. The tag antenna 88 typically changes its physical characteristics, such as for instance, the position, from position 392 to position 402, to improve the SNR of the modulated carrier signal 95. Alternatively, multiple tag antennas might be specially manufactured or might adapt themselves to change the relative phases and amplitudes of the modulated carrier signal 95 to improve the SNR of the modulated carrier signal 95.

Another conventional embodiment is an uniform linear array (ULA), which is an array of antennas, placed in a straight line and equally spaced in the IT. The array weights are computed to form a beam that is steered to a particular angle. The angle must be known a priori or estimated based on signals previously received by a receiver. This method to calculate the weights of the antennas in the IT is prone to angle estimation error and does not significantly enhance the SNR of the modulated carrier signal. Moreover, the locations of the IT antennas are constrained to be uniformly linear, and therefore cannot be placed in arbitrary locations to provide, for example, macrodiversity.

Hence an unaddressed need exists in the field for a system and method for improving the characteristics of a modulated carrier signal without changing the physical characteristics of the tag antennas such as, for instance, position of the tag antennas; without adopting or manufacturing the tag antennas to produce certain relative RF phases and amplitudes; without restricting the communication of channel information to wireless RF transmissions; and/or without constraints on the locations of antennas in the IT array.

SUMMARY OF THE INVENTION

The present invention overcomes the inadequacies and deficiencies of the prior art as discussed herein by providing for a smart antenna reflection system and method that improves the characteristics of a modulated carrier signal.

In this regard, a representative embodiment of a smart reflection antenna system includes an interrogator transmitter (IT) having an IT array of at least two antennas of the IT array. The system also includes a tag having a tag array of at least one antenna. The tag being configured to simultaneously receive the carrier signal from the IT array via the tag array, modulate the carrier signal into a modulated carrier signal; and simultaneously transmit the modulated carrier signal via the tag array. The system also includes an interrogator receiver (IR) having an IR array of at least two antennas, the IR being configured to simultaneously receive the modulated carrier signal from the tag array via multiple antennas of the IR array.

In another embodiment, the invention may be constructed as a method for improving the characteristics of a modulated carrier signal. The method comprising the steps of:

determining a product channel matrix between an interrogator transmitter (IT) antenna array and an interrogator receiver (IR) antenna array, wherein the product channel matrix is the product of a matrix of complex channel gains between the IT antenna array and a tag antenna array and a matrix of complex sideband channel gains between the tag antenna array and the IR antenna array; calculating antenna weight vectors for the IT antenna array and the IR antenna array from the product channel matrix; and controlling the weights of antennas of the IT antenna array with the calculated antenna weight vectors, such that the signal-to-noise ratio (SNR) is maximized for the modulated carrier signal.

Other systems, methods, features, and advantages of the present invention will become more apparent to one with skill in the art upon examination of the following drawings and detailed description. It is intended that all such additional systems, methods, features, and advantages be included within this description, be within the scope of the present incention, and be protected by the accompanying claims.

BRIEF DESCRIPTION OF THE DRAWINGS

The invention can better be understood with reference to the following drawings. The drawings are not necessarily to scale, emphasis instead being placed upon clearly illustrating the principles of the present invention. Furthermore, like reference numerals designate corresponding parts throughout the several views.

DETAILED DESCRIPTION OF THE INVENTION

Figure 4:
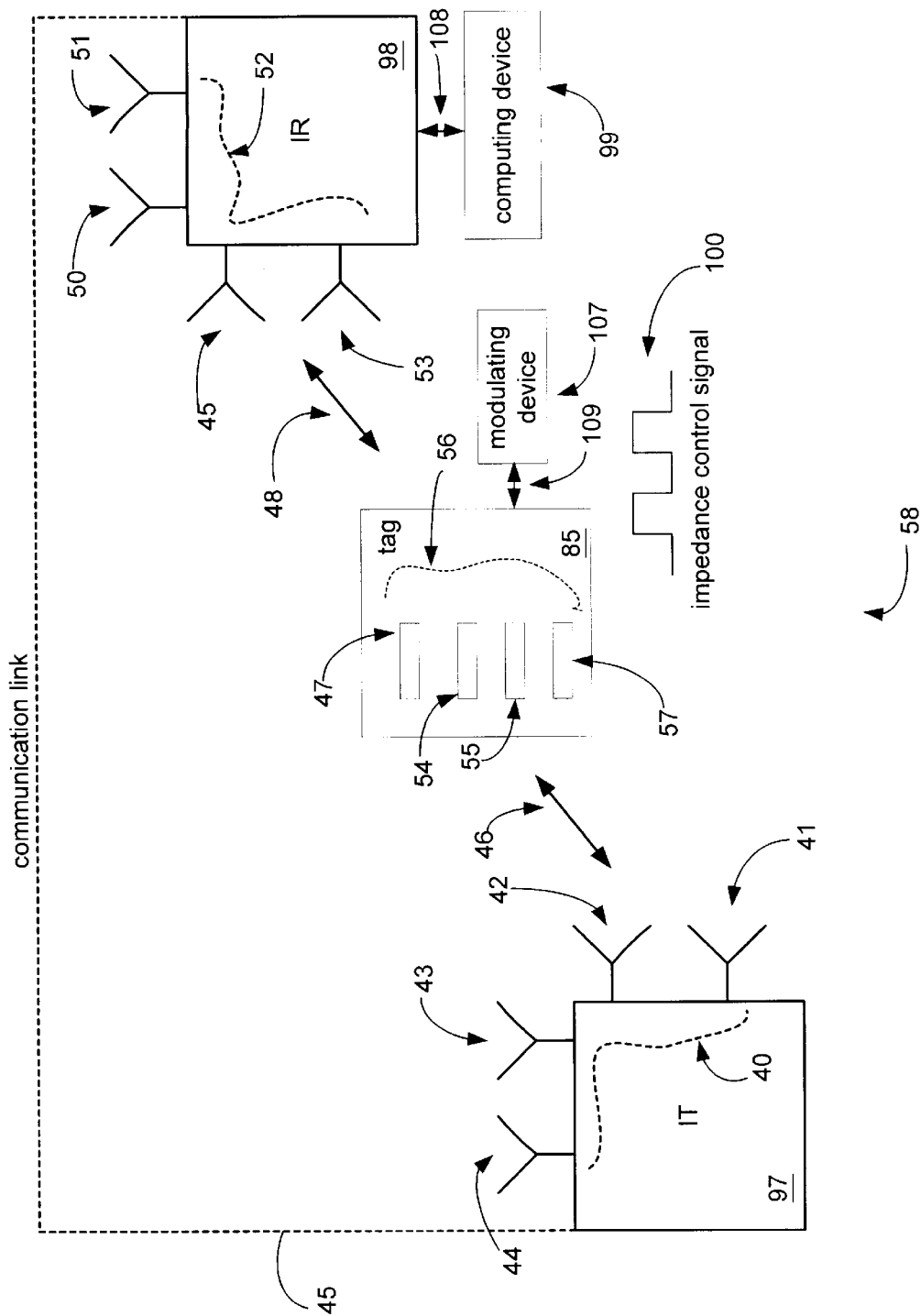
FIG. 4 shows an embodiment of the present invention for improving the SNR of a modulated carrier signal, in accordance with the present invention.

FIG. 4 shows a smart reflection antenna system 58 in accordance with a first embodiment. The smart reflection antenna system 58 includes an Interrogator Transmitter (IT) 97 coupled to an array of antennas 41–44 referred to collectively as the IT array 40. The system 58 also includes a tag 85 coupled to an array of tag antennas 47, 54, 55, and 57 referred to collectively as the tag array 56. The system 58, furthermore, includes an Interrogator Receiver (IR) 98 coupled to an array of antennas 51, 50, 45, and 53 referred to collectively as the IR array 52. The IT 97, tag 85, or the IR 98 may be implemented in hardware, software, or in combination thereof.

If desired, arrays of antennas can be used at either or both of the IT array 40 or the IR array 52. Any number of antennas can be used in the IT array 40, the tag array 56, and the IR array 52. Furthermore, only one tag antenna instead of multiple tag antennas, may be used in the tag array 56. One of the effects of increasing the number of tag antennas, and using the tag antennas 47, 54, 55, and 57 to identically modulate backscatter the carrier signal 46 is to increase the total average reflected power because of an increased cumulative surface area of the tag antennas. With an increase in the number of tag antennas 47, 54, 55, and 57, there is no substantial increase in the diversity gain, that is, no substantial reduction in fading margin, provided by the tag antennas. Generally, the diversity gain, which is provided by the IT array 40 and the IR array 52, increases with the number of antennas on the IT array 40 and the IR array 52.

An array at the IT 97 provides transmit diversity, which protects the carrier signal 46 from multipath fading on its way to the antennas 47, 54, 55, and 57 in the tag array 56. An array at the IR 98 protects the modulated carrier signal 48 from multipath fading on its way from the tag array 56 to the IR array 52. The IT array 40 and the IR array 52 yield diversity gains similar to the diversity gains employed in links with active transmitters. Therefore, the only placement consideration is that the antennas 41–44 in the IT array 40 are typically spaced sufficiently far apart, for example, about 3 wavelengths or more, to achieve the maximum diversity gain. Similarly, the antennas 47, 54, 55, and 57 in the tag array 56, and the antennas 51, 50, 45, and 53 in the IR array 52 are generally spaced sufficiently far apart to achieve the maximum diversity gain. Conventionally, arrays at the IT 97 have only been considered for conventional beamforming, and not for the optimal diversity benefit being considered here.

The antennas at any of the remote platforms IT 97, tag 85, or IR 98, are not required to have any particular placement. The platforms IT 97, tag 85, or the IR 98 may even be extended in the sense that the antennas for the IT array 40, for instance, may be spread about an area. A reason that the IT array 40 is separated from the IR array 52 is so the IR array 52 can adequately suppress the carrier signal 46. The IT array 40 and the IR array 52 could be overlapping or even the same if adequate isolation in the IR RF front end can be achieved.

Furthermore, the tag array 56 can be located in or coupled to an actively powered device or a passively powered device. An actively powered device is a device that runs on a power source and allows communication across short and long ranges of distances. Generally, an actively powered device uses RF propagation to transmit information. Examples of an actively powered device include but are not limited to, an active transmitter, or a passive transmitter. An example of an active transmitter, includes, but is not limited to, a transmitter that uses an array-to-array link that does not use modulated backscatter. Preferably, in FIG. 4, the tag array 56 is located in or coupled to, passive transmitters. An example of a passive transmitter is a transmitter that uses modulated backscatter. However, other kinds of passive transmitters known to ordinary people skilled in the art can also be used.

Moreover, the IR array 52 and the IT array 40 can be located in various places including, but not limited to, a ceiling of a store such as a grocery store, soldier man-packs, manned or unmanned vehicles in a battle field, or electronic toll gates. The tag array 56 can be located in places including, but not limited to, electronic shelf tags (EST) on the shelves of a store, forward-deployed sensors in a battlefield, automobiles, buses, train-cars, or shipping containers.

A modulating device 107, including but not limited to, a switch that is coupled via link 109 to any one of the tag antennas in the tag array 56, or to any combination of the antennas in the tag array 56, can be used to produce the modulated carrier signal 48 based on the impedance control signal 100. Preferably, a diode switch that switches all the tag antennas in the tag array 56, is used to produce the modulated carrier signal 48 based on the impedance control signal 100, and the impedance control signal 100 is shared simultaneously by all the tag antennas 47, 54, 55, and 57 in the tag array 56. Moreover, any modulating device 107 that modulates the reflection coefficients of the tag antennas 47, 54, 55, and 57, and is known to ordinary people skilled in the art, can be used to generate the modulated carrier signal 48.

The IT 97, via IT array 40, transmits a carrier signal 46 to the tag array 56. The carrier signal 46 is modulated back-scattered by the tag 85 according to an impedance control signal 100 from modulating device 107 to produce a modulated carrier signal 48. Modulation techniques, include, but are not limited to, Quadrature Amplitude Modulation (QAM), on/off keying, or amplitude modulation. Preferably, to transmit one bit of information, the impedance control signal is a periodic square wave with a pulse rate of 25 kHz and a 50% duty cycle. Generally, the range of pulse rates extends to 40 kHz. However, other duty cycles and other pulse rates can also be used. Furthermore, the impedance control signal 100 can be any waveform including, but not limited to, a cosine waveform, a sine waveform, and preferably, a square waveform.

The tag 85 transmits a modulated carrier signal 48 to IR array 42 via the tag array 56,. A computing device 99 including, but not limited to, a microprocessor or a computer determines information regarding a channel (not shown) between the IT array 40 and the IR array 52, after the modulated carrier signal 48 is received by the IR array 52. The computing device 99 may be coupled to the IR 98, via link 108, or located within the IR 98. Alternatively, the computing device 99 may be coupled to or located within the IT 97. The computing device 99 may instead be coupled to or located within the tag 85. Preferably, the computing device 99 is coupled to both the IT 97, and the IR 98. Furthermore, the computing device 99 may be implemented in hardware, software, or in combination thereof. A communication link 45 communicates channel information regarding a channel between the IT 97 and the IR 98 from the IR array 52 to the IT array 40. The communication link 45 could be a link including, but not limited to a wire, or a wireless link such as a RF link. In the case where the IT array 40 and the IR array 52 are coupled to or located in the same device, the communication link 45 may be unnecessary. The computing device 99 determines the weights of the antennas in the IT array 40 and the IR array 52, based on the information regarding the channel. The weights are then used to improve the SNR of the modulated carrier signal 48.

Figure 5:
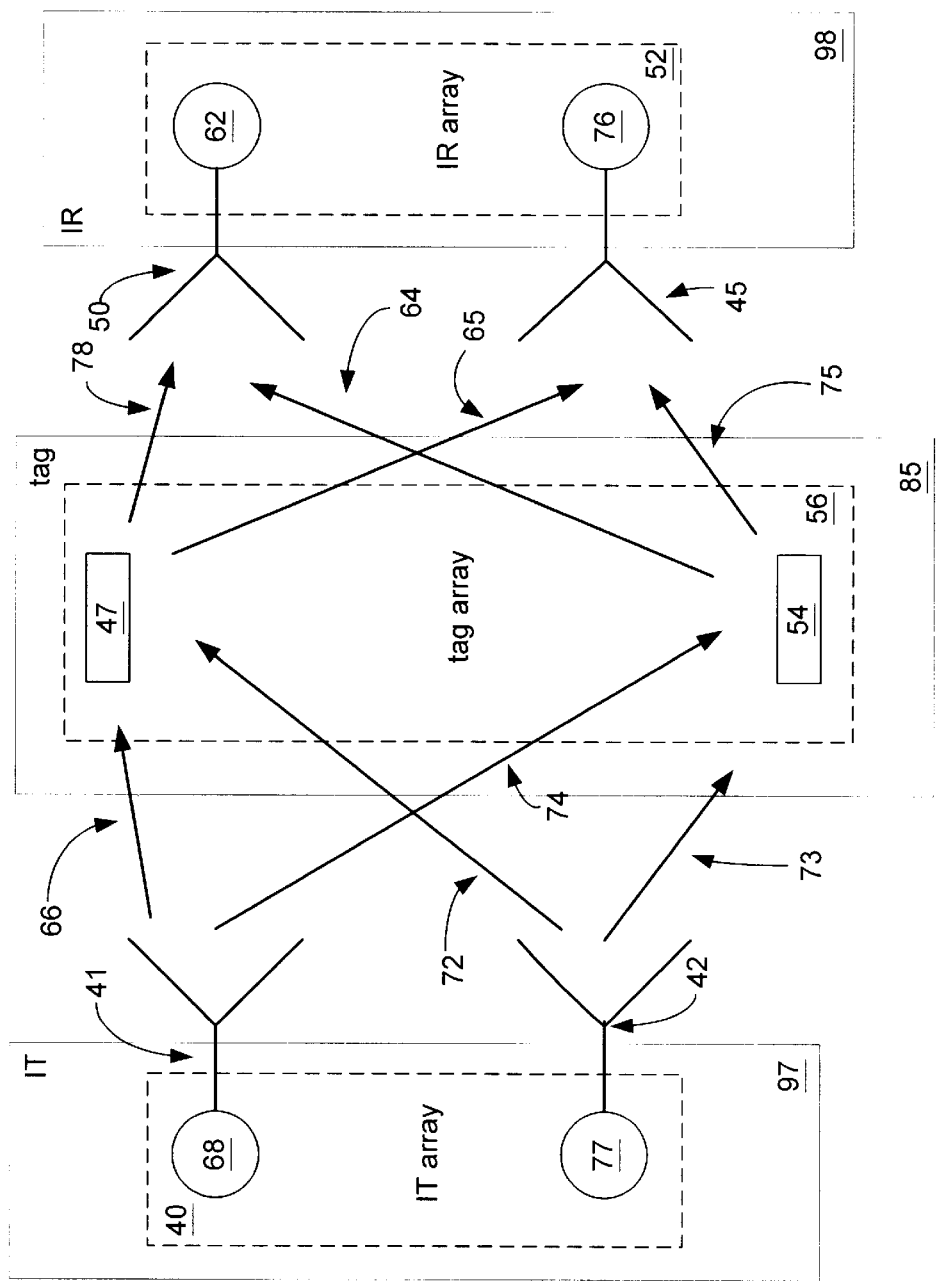
FIG. 5 shows the channel gains from the IT array to the tag array, the sideband channel gains from the tag array to the IR array, and the weights of the antennas in the IT array and the IR array, in accordance with the present invention.

The algorithm for computing the weights of the antennas in the IT array, termed as the IT antenna weights, and the weights of the antennas in the IR array, termed as the IR antennas weights, to provide the maximum SNR is now explained. FIG. 5 shows the channel gains 66, 74, 72, and 73 between the antennas 41 and 42 in the IT array 40 and the tag antennas 47 and 54 in the tag array 56. Let these gains be denoted $H_{11}$, $H_{12}$, $H_{21}$, and $H_{22}$, respectively, and let them compose the channel matrix H, $$H = \begin{bmatrix} H_{11} & H_{12} \\ H_{21} & H_{22} \end{bmatrix}.$$

Similarly, let the sideband channel gains 78, 65, 64, and 75 between the tag antennas 47 and 54 in the tag array 56, and the IR antennas 50 and 45 in the IR array 52, be denoted $G_{11}$, $G_{12}$, $G_{21}$, and $G_{22}$, respectively, and let these gains compose the channel matrix G.

The computing device 99 (FIG. 4) identifies the product channel matrix $C_P$=HG. In FIG. 5, the computing device 99 can be coupled to or located in the IT 97, tag 85, or the IR 98, or may be independently located without being coupled to any device. The identification of $C_p$ can be as straightforward as successively sending a pilot or test signal from each IT antenna 41, 42 and measuring the responses at each IR antenna 45, 50. Blind channel identification methods may also be employed to avoid the overhead associated with pilot signals.

The computing device 99 then performs a singular value decomposition or approximate operation on $C_P$, given by $C_P = U\Sigma V^H$, where the columns of U are the left singular vectors, $\Sigma$ is a diagonal matrix of the singular values of $C_P$, the columns of V are the right singular vectors, and the superscript "H" means conjugate transpose. Let $U_{max}$ and $V_{max}$ be the left and right singular vectors, respectively, corresponding to the maximum singular value $\sigma_{max}$. Let the IT antenna weights 68 and 77 be denoted $X_1$ and $X_2$, respectively, and define the IT antenna weight vector as $X=[X_1, X_2]$. Similarly, let the IR antenna weights 62 and 76 be denoted $W_1$ and $W_2$, respectively, and define the IR antenna weight vector as $W=[W_1, W_2]$. An expression showing the carrier and first sideband components of an output signal in the IR 98 is $$z(t) = XC_P W^H m(t)\cos([\omega_c + \omega_0]t + \theta) + b\cos(\omega_c t + \theta') + n(t) +$$

where m(t) is an information waveform, $\omega_c$ is the RF carrier frequency (rad/sec), $\omega_0/2\pi$ is the pulse repetition rate of a periodic square wave, $\theta$ and $\theta'$ are sideband and carrier phases, respectively, b $\cos(\omega_c t+\theta')$ is the carrier component and n(t) is the additive thermal noise. The other sidebands, which are also proportional to $XC_P W^H$, are not shown. By the properties of the singular value decomposition, the weight vectors $X=U_{max}^H$ and $W=V_{max}^H$ maximize the value of $XC_P W^H$, and that maximum value is $\sigma_{max}$. Therefore these weight vectors also optimize the SNR of z(t).

When a wire couples the IT array 40 and the IR array 52 in FIG. 4, both the weight vectors can be computed at a location, not necessarily at either the IR array 52 or the IT array 40, and conveyed to either the IR array 52 or the IT array 40 for application. When the IT array 40 and the IR array 52 are not coupled by wire, then the IR array 52 can transmit the weights 62 and 76 in FIG. 5 to the IT array 40. The weights must be updated as the channel between the IT 97 and the IR 98 changes, approximately on the order of ten times a second to compensate for motion of any objects in an indoor multi-path environment, and after each change of the carrier signal 48's frequency in a frequency-hopped system. Also, the bandwidth of the wire connection between the IT array 40 and the IR array 52 is at most as wide as the bandwidth of an impedance control signal corresponding to the information waveform.

Figure 3:
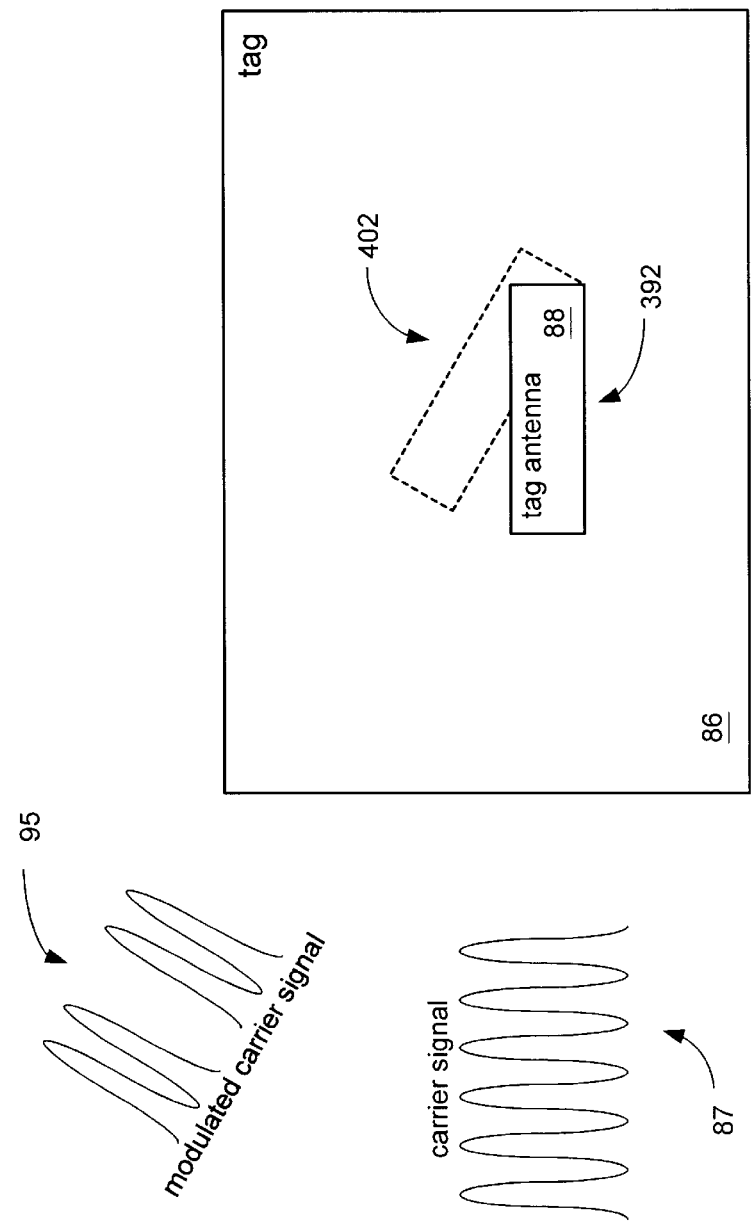
FIG. 3 shows a conventional tag antenna that typically changes its physical characteristics, such as for instance, the position, to improve the SNR of the modulated carrier signal.

The smart antenna reflection system and method is based on the idea that for any antenna array to do beamforming or to provide transmit diversity gain, the signals emitted by the antennas have certain precise phase and amplitude relationships. Since preferably, antennas in the tag array 56 (FIG. 4) do not generate their own carrier signals, they cannot achieve these relative phases and amplitudes, using phase shifters or baseband phase encoding as arrays in active devices do. In conventional tag arrays that are used in passive devices, this phase relationship is achieved by varying the physical characteristics of the antennas in the tag array 56 so that their reflection coefficients have different desired phases and amplitudes (FIG. 3). The ability of tag antennas to create certain relative phases and amplitudes between their respective modulated carrier signals implies a significantly greater expense compared to tag antennas that do not have this feature.

Figure 6:
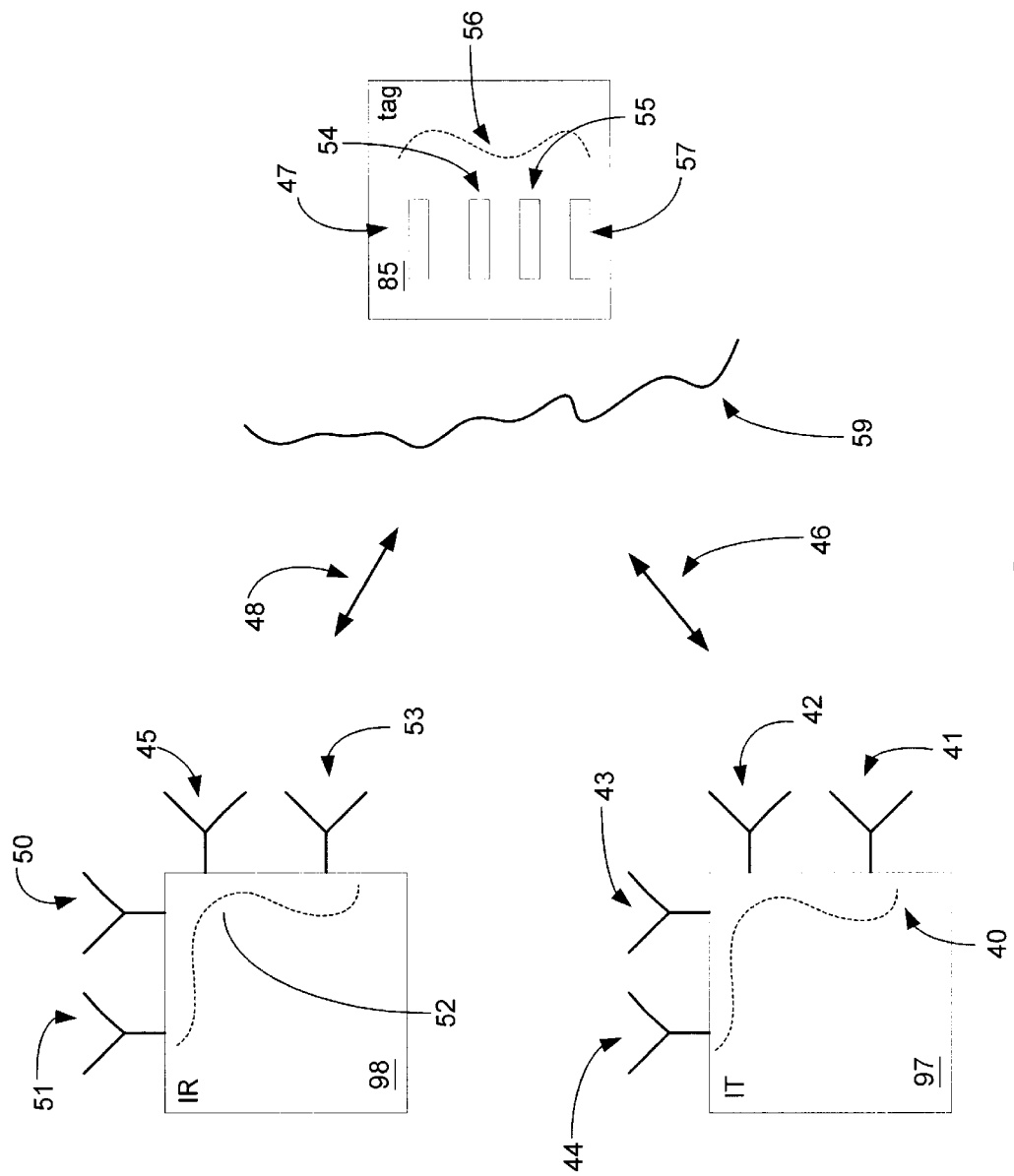
FIG. 6 shows the IT antennas that can be used to create distorted phase front, thereby eliminating the need to change the physical characteristics of tag antennas, in accordance with the present invention.

The present invention avoids this expense by using the IT array 40 in FIG. 6 to provide the phase and amplitude control to improve the SNR of the modulated carrier signal. FIG. 6 shows that the antennas 41–44 in the IT array 40 provide a distorted phase front 59. The distorted phase front 59 impinges on the antennas 47, 54, 55, and 57 in the tag array 56, to provide the required relative phases. The distorted phase front 59 can be changed, with convenience and ease, as needed by electronic control of the weights of the antennas 41–44 of the IT array 40. The weights can be electronically controlled by the computing device 99 (FIG. 4). Hence, in FIG. 6, a control of the weights helps produce a distorted phase front 59 to enhance the SNR of the modulated carrier signal received by the IR array 52.

Figure 7A:
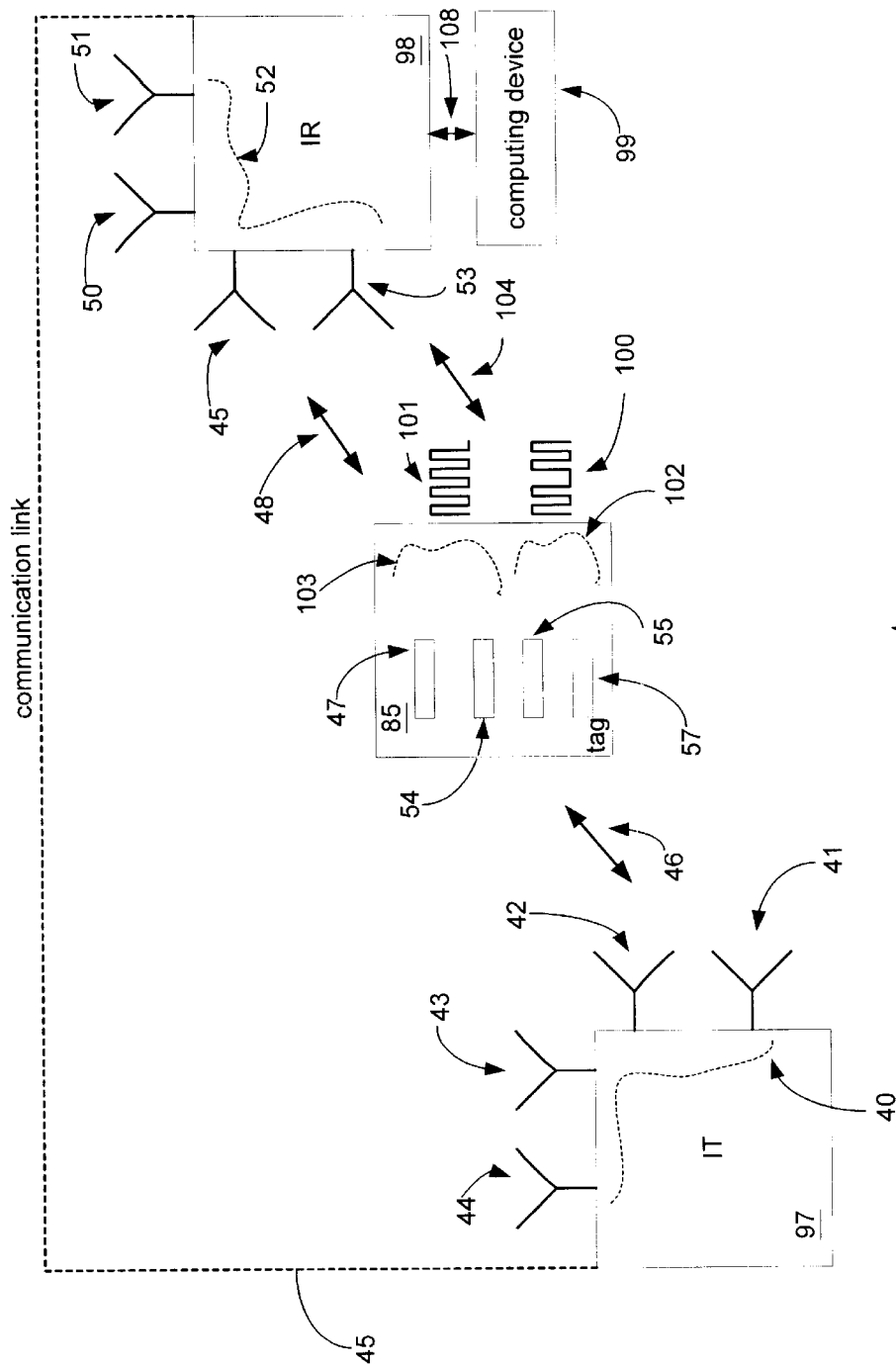
FIG. 7A shows a second embodiment of the present invention that uses different data streams to modulate backscatter the carrier signal.
Figure 7B:
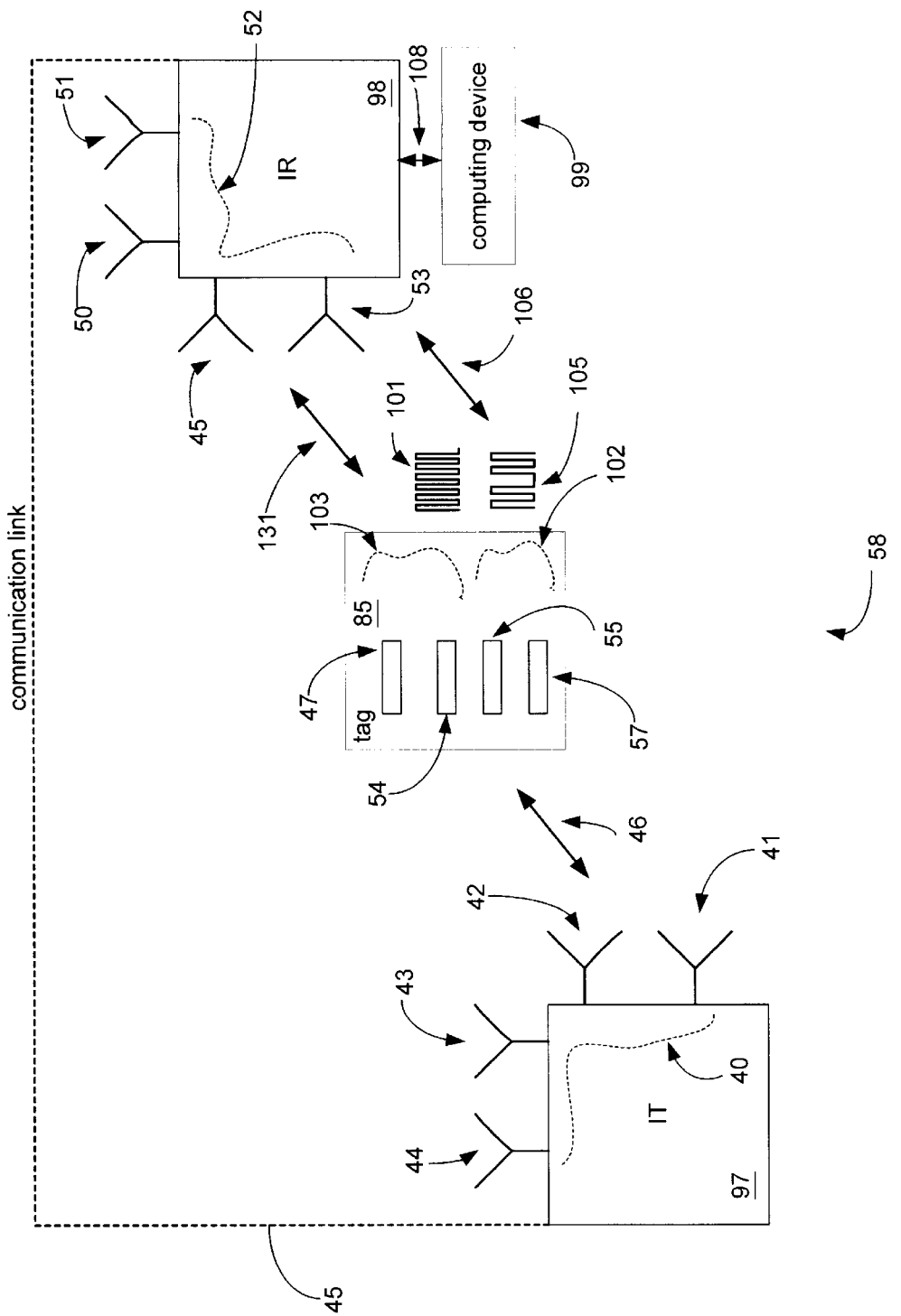
FIG. 7B shows the second embodiment of the present invention that uses different data streams and different modulation techniques to modulate backscatter the carrier signal.

In the second embodiment shown in FIGS. 7A and 7B, a carrier signal 46 is transmitted from the IT array 40 to the tag array 52. The carrier signal 46 is modulated backscattered and then further transmitted from the tag array 56 to the IR array 52. The computing device 99 (FIG. 4) determines the information regarding the channel between the IT array 40 and the IR array 52, after the IR array 52 receives the modulated carrier signals. The information is used to calculate the weights of the antennas 41–44 in the IT array 40 and the antennas 51, 50, 45, and 53 in the IR array 52, to enhance the characteristics of the modulated carrier signals.

The second embodiment allows for tag antennas 47, 54, 55, and 57 to be partitioned into groups 103 and 102, such that each group contains at least one tag antenna, and for the groups to modulate their reflections according to different data streams and/or different modulation techniques. Hence, a SNR corresponding to a single data stream is no longer a useful cost function, since there are multiple data streams. This leads to a different channel estimation procedure and a different solution for the transmit weights, weights of antennas 41–44 in the IT array 40. Furthermore, the tag antennas 47, 54, 57, and 55 can be adaptively grouped based on information regarding the channel.

The embodiment is further subdivided into, but is not limited to, two types. The first type, shown in FIG. 7A, uses co-channel modulation where the only difference in the impedance control signals 100 and 101 used by different groups 102 and 103 is that they convey different data streams. For instance, two tag antennas 47 and 54 in a group 103 can be used to modulate according to one impedance control signal 101 to produce the modulated carrier signal 48, and the other two tag antennas 55 and 57 in group 102 can be used to modulate according to a different impedance control signal 100 to produce the modulated carrier signal 104.

The different groups 103 and 102 could be coupled to or located inside the same tag 85, or in different tags. The former enables a single tag 85 to increase the transmission data rate through the creation of parallel spatial channels. In this embodiment, as in the first embodiment, the computing device 99 uses information regarding the channel to calculate the weights of the antennas 41–44 in the IT array 40 and the antennas 51, 50, 45, and 53 in the IR array 52.

Figure 1A:
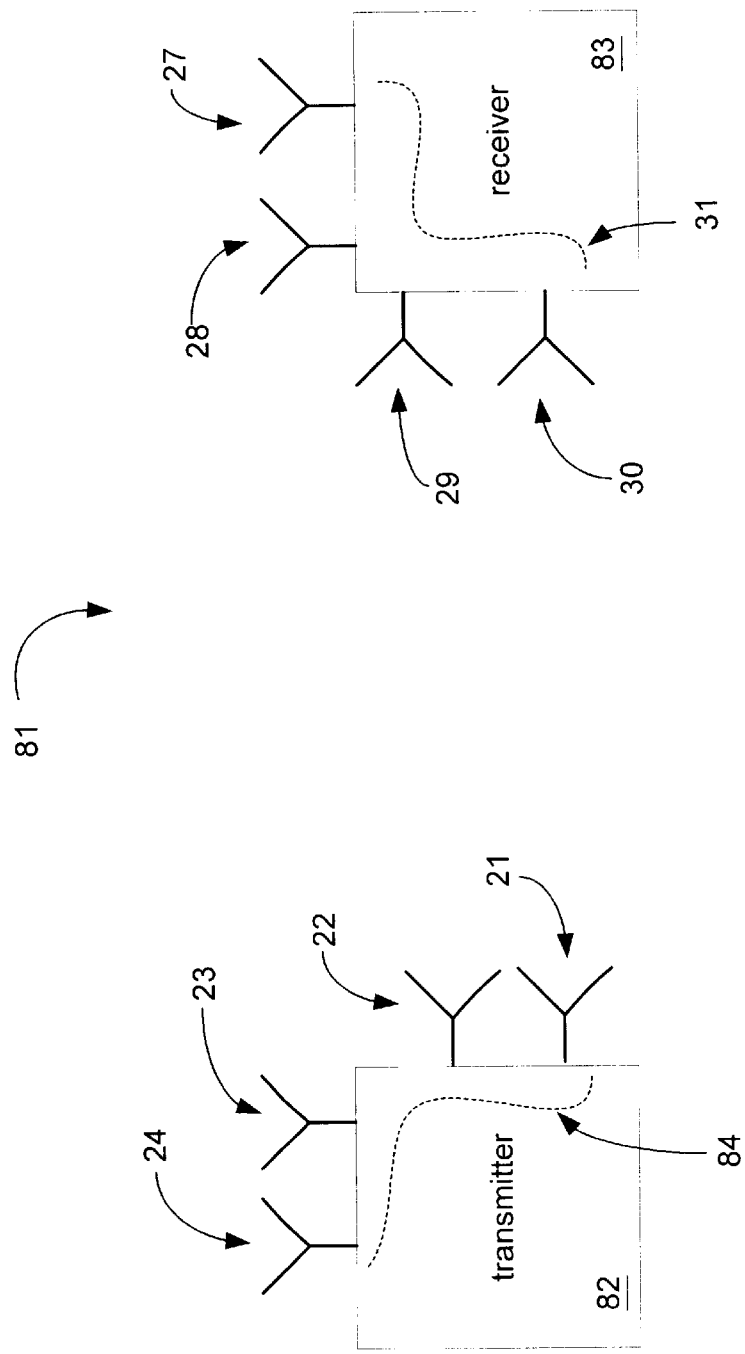
FIG. 1A is a diagram of a conventional array-to-array link with an uninformed transmitter, that does not use modulated backscattering.
Figure 1B:
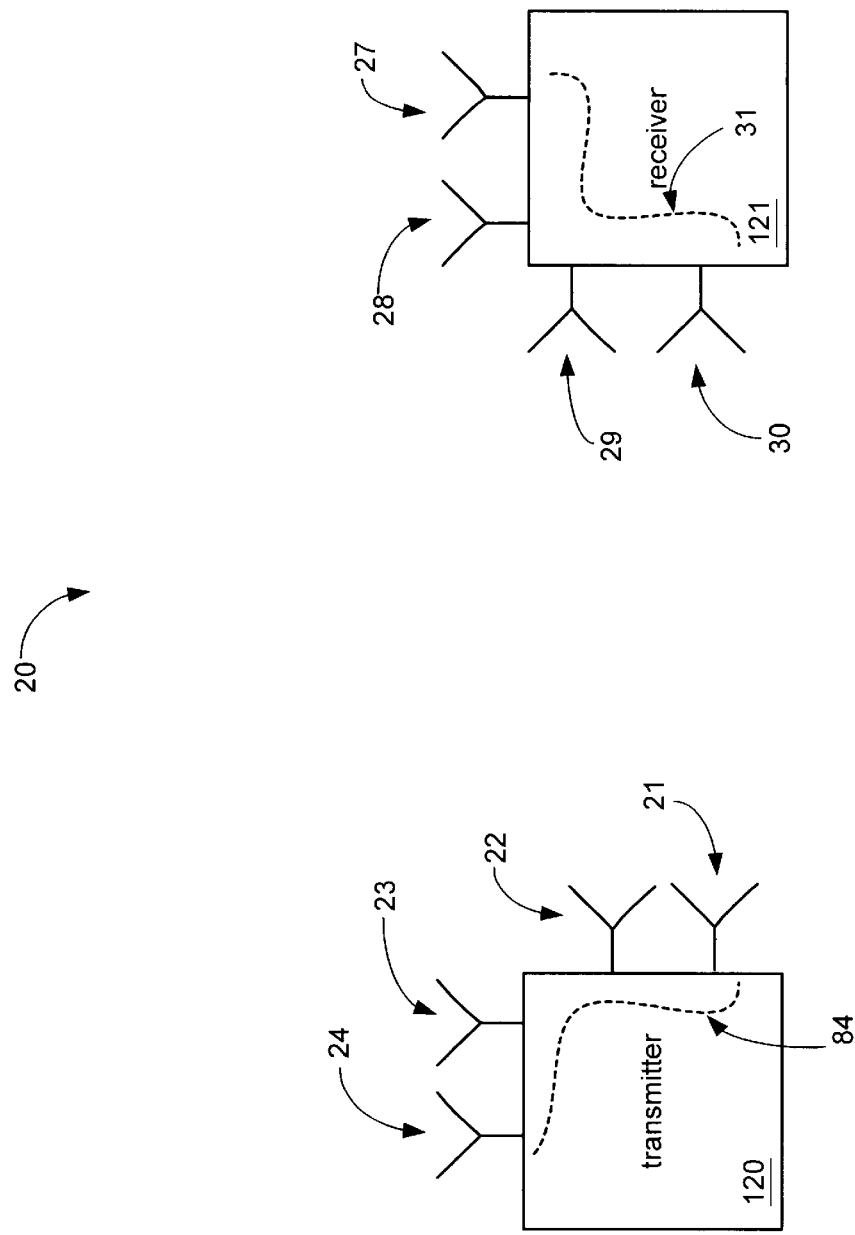
FIG. 1B is a diagram of a conventional array-to-array link with an informed transmitter, that does not use modulated backscattering, where the information regarding the channel between the IT array and the IR array can be communicated only in a RF transmission.
Figure 2A:
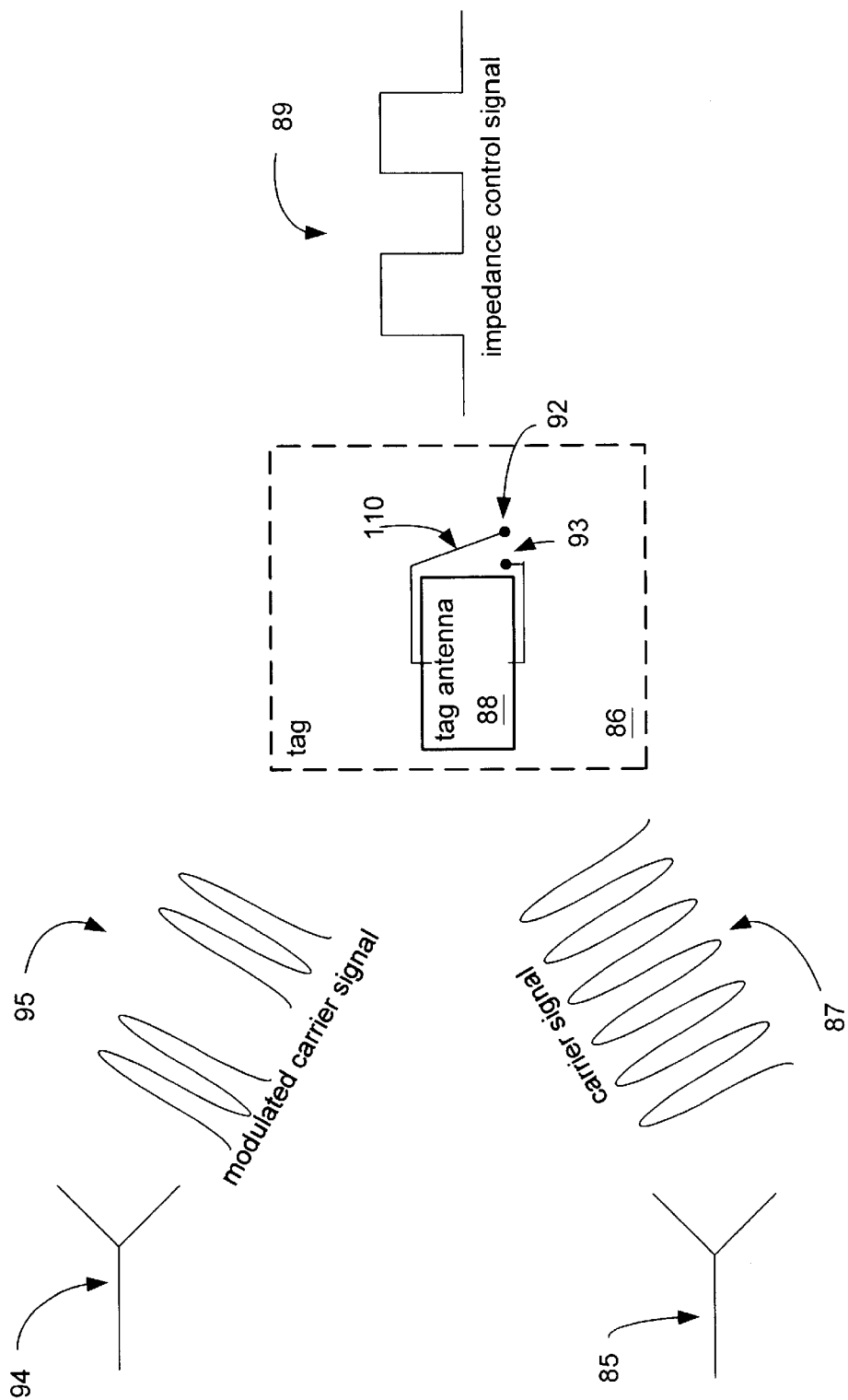
FIG. 2A shows a conventional transponder or a tag that uses passive transmission.
Figure 2B:
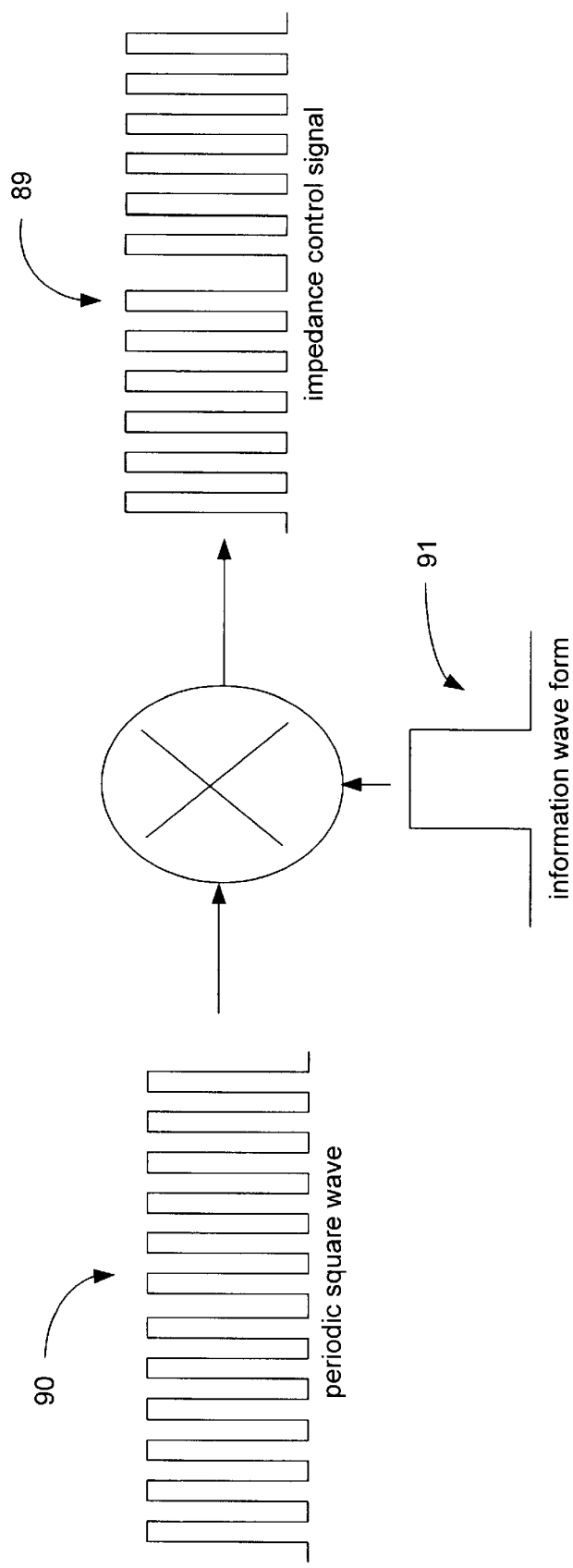
FIG. 2B is a diagram that shows an impedance control signal that may be a product of a periodic square wave and an information waveform.

When the impedance control signals 101 and 100 are co-channel, the modulated carrier signals 48 and 104 interfere with each other at every antenna 51, 50, 45, and 53 of the IR array 52, in the same way as the different signals from the active transmitters interfere with each other in the array-to-array link with uninformed transmitter (FIG. 1A). As in the array-to-array link with uninformed transmitter, the IR array 52, in FIG. 7A, can distinguish between the different modulated carrier signals 48 and 104 according to the difference in the "spatial signatures" of their respective tag antenna groups 103 and 102. The term spatial signature refers to the vector response of the IR array 52 for a given tag antenna group 102 or 103. In order for the spatial signatures to be sufficiently distinct, generally, no two tag antennas from the different groups 102 and 103, can be too close. The minimum separation should be at least a half wavelength in a rich scattering environment, and by more than approximately three wavelengths in a sparse scattering environment for best performance. In this case of co-channel modulation, multiple antennas in the IR 98 are required, in accordance with prior art, because only an antenna array can distinguish spatial signatures. The advantage of co-channel modulation is that there is no bandwidth expansion as different data streams are added.

In the second type of modulation shown in FIG. 7B, the impedance control signals for different groups differ not only in that they convey data streams, but also in the technique of modulation. For example, different periods of a periodic square wave, result in different impedance control signals 101 and 105 that can be used for the different groups 103 and 102, leading to different sideband locations in the modulated carrier signals 131 and 106. This is frequency division multiplexing of the sidebands (not shown). Any technique of modulation known to ordinary people skilled in the art, can be used.

It follows that an IR 98 with only one antenna could separate the two modulated carrier signals 131 and 106 by filtering in the frequency domain and there is no minimum spacing required between the tag antennas 47, 54, 55, and 57. The IT and IR antenna weights would be the same as in the first embodiment.

As another example, the periodic square wave factors of the impedance control signals 101 and 105 can be the same, but the information waveform factors of 101 and 105 can be coded differently, for instance, by using different code words as in code-division multiplexing (CDM). The information waveform factors of the impedance control signals 101 and 105 can be coded using any modulation technique known to ordinary people skilled in the art. The overall requirement on the impedance control signals in this second type of modulation is that they typically be orthogonal waveforms and therefore separable by conventional means in the IR 98.

In both of the above embodiments, the purpose of the antennas is, in part, to provide spatial transmit diversity. It is well known to ordinary people skilled in the art that to achieve maximum diversity gain, the antennas generally have a minimum spacing. The placement of IT antennas 41–44 is otherwise arbitrary. The IR antennas 51, 50, 45, and 53 have a similar function and therefore generally, have similar minimum spacing.

In the second embodiment, a single IT weight vector and multiple IR weight vectors are needed, one IR weight vector for each impedance control signal and its associated data stream. The IR weight vectors can be computed according to conventional multi-user techniques. However, there is no conventional technique that specifies the best IT vector.

Furthermore, in the second embodiment, no longer can the IT vector be computed to maximize SNR corresponding to a single data stream because there are now multiple data streams, each with their own SNR in the IR 98. An alternative cost function for IT weight vector optimization can be average link capacity in bits/sec/Hz. The average is taken with respect to the multipath fading of the matrix channel gains.

An algorithm to calculate an IT weight vector that yields a higher average link capacity than the IT weight vector in the first embodiment, is now described. First, it will be assumed that each tag antenna modulates according to an independent data stream. By allowing only one tag antenna at a time to be modulated, each column of H can be identified up to a complex constant. That is, if $H_i$ is the ith column of H, and if $G_i$ is the ith row of G, then the matrix $\tilde{H}=HA$ can be identified, where A is a diagonal matrix with ith diagonal element $$A_{ii}=|G_i|^2.$$

In other words, each column of $\tilde{H}$ is a column of H weighted by a different factor. The relative norms of the columns of H cannot be identified because of the product nature, HG, of this kind of channel. The approach is to eliminate the random effects of that which cannot be identified by normalizing each column of $\tilde{H}$ to have unit norm. In other words, a new matrix, $\overline{H}$ is created such that $$\overline{H} = \left[ \frac{H_1}{|H_1|} \quad \frac{H_2}{|H_2|} \quad \cdots \quad \frac{H_N}{|H_N|} \right],$$

where N is the number of tag antennas. The IT array vector is then set to be the conjugate transpose of the left singular vector of, $\overline{H}$ that corresponds to the maximum singular value of, $\overline{H}$. This solution is the least squares fit to the N optimal, normalized transmit diversity weight vectors for each tag antenna.

If the tag antennas are partitioned into groups such that all the tag antennas in a group can be used to modulate according to a single impedance control signal, then the above solution is modified as follows. The IT array vector is assigned to be the conjugate transpose of the left singular vector of H*, where the ith column of H* is the optimal IT array vector for the ith group, computed by the methods of the first embodiment, and finally normalized to have unit norm. To identify the product channel matrix for a particular group, there is a period of time during which only that group modulates its impedance and the other groups do not modulate. As an alternative to the time-consuming procedure of the groups taking turns to modulate for the purpose of channel identification, the groups can modulate at the same time, but using different pulse repetition rates, thereby making their sidebands separable in the frequency domain.

In concluding the detailed description, it should be noted that it will be obvious to those skilled in the art that many variations and modifications may be made to the embodiments without substantially departing from the principles of the present invention. All such variations and modifications are intended to be included herein within the scope of the present invention, as set forth in the following claims.

What is claimed is:

1. A smart reflection antenna system comprising:
    an interrogator transmitter (IT) having an IT array of at least two antennas, the IT being configured to simultaneously transmit a carrier signal from multiple antennas of the IT array;
    a tag having a tag array of at least one antenna, the tag being configured to:
        simultaneously receive the carrier signal from the IT array via the tag array;
        modulate the carrier signal into a modulated carrier signal; and
        simultaneously transmit the modulated carrier signal via the tag array; and
    an interrogator receiver (IR) having an IR array of at least two antennas, the IR being configured to simultaneously receive the modulated carrier signal from the tag array via multiple antennas of the IR array.

2. The smart reflection antenna system as defined in claim 1, wherein a computing device determines the information regarding a channel between the IT array and the IR array, after the IR array receives the modulated carrier signal.

3. The smart reflection antenna system as defined in claim 2, wherein the IR array is further configured to communicate the information to the IT array.

4. The smart reflection antenna system as defined in claim 3, wherein the computing device uses the information to control weights of the antennas in the IT array to produce a distorted phase front to enhance characteristics of the modulated carrier signal.

5. The smart reflection antenna system as defined in claim 1, wherein the tag array is divided into at least two groups, wherein each group has at least one antenna.

6. The smart reflection antenna system as defined in claim 5, wherein each group uses different data streams to modulate the carrier signal.

7. The smart reflection antenna system as defined in claim 5, wherein each group uses the different data streams and different modulation techniques to modulate the carrier signal.

8. The smart reflection antenna system as defined in claim 7, wherein the modulation techniques is a group consisting of code-division multiplexing (CDM), or frequency division multiplexing (FDM).

9. The system of claim 1, wherein the tag is further configured to simultaneously receive the carrier signal from multiple antennas of the IT array via multiple antennas of the tag array; and
    wherein the IR is further configured to simultaneously receive the modulated carrier signal from multiple antennas of the tag array via multiple antennas of the IR array.

10. The system of claim 1, wherein the at least one antenna of the tag array is a reflective antenna.

11. A smart reflection antenna system comprising:
    an interrogator transmitter (IT) having an IT array of at least two antennas, the IT being configured to simultaneously transmit a carrier signal from multiple antennas of the IT array;
    a tag having a tag array of at least one antenna, the tag being configured to:
        simultaneously receive the carrier signal from the IT array via the tag array;
        modulate the carrier signal into a modulated carrier signal; and
        simultaneously transmit the modulated carrier signal via the tag array; and
    an interrogator receiver (IR) having an IR array of at least two antennas, the IR being configured to simultaneously receive the modulated carrier signal from the tag array via multiple antennas of the IR array; and
    a communication link connecting the IR array to the IT array.

12. The smart reflection antenna system as defined in claim 11, wherein the communication link is a wired connection.

13. The smart reflection antenna system as defined in claim 11, wherein a computing device determines information regarding a channel between the IT array and the IR array, after the IR array receives the modulated carrier signal.

14. The smart reflection antenna system as defined in claim 13, wherein the IR array communicates the information to the IT array, via the communication link.

15. The smart reflection antenna system of claim 11, wherein the communication link is a wireless connection.

16. A method for improving the characteristics of a modulated carrier signal, the method comprising the steps of:
    determining a product channel matrix between an interrogator transmitter (IT) antenna array and an interrogator receiver (IR) antenna array, wherein the product channel matrix is the product of a matrix of complex channel gains between the IT antenna array and a tag antenna array and a matrix of complex sideband channel gains between the tag antenna array and the IR antenna array;
    calculating antenna weight vectors for the IT antenna array and the IR antenna array from the product channel matrix; and controlling the weights of antennas of the IT antenna array with the calculated antenna weight vectors, such that the signal-to-noise ratio (SNR) is maximized for the modulated carrier signal.

17. The method of claim 16, wherein the modulated carrier signal is a carrier signal that is transmitted from the IT array, modulated backscattered and transmitted to the IR array.

18. The method of claim 16, wherein determining the product channel matrix comprises the step of identifying elements of the product channel matrix.

19. The method of claim 18, wherein identifying elements comprises the steps of:
    sending test signals from each antenna of the IT antenna array; and measuring the responses of the test signals at each antenna of the IR antenna array.

20. The method of claim 16, wherein calculating antenna weight vectors comprises the step of performing a singular value decomposition on the product channel matrix.

21. The method of claim 16, wherein upon controlling the weights of the IT antenna array, a distorted phase front is produced.

22. The method of claim 16, further comprising the step of:

controlling the weights of antennas of the IR antenna array with the calculated antenna weight vectors.

23. The method of claim 16, wherein the tag antenna array comprises at least two groups of antennas, and wherein the steps of determining a product channel matrix, calculating antenna weight vectors, and controlling the weights are performed for each group of antennas.

24. The method of claim 23, further comprising the steps of:

normalizing each weight vector to unit norm;

generating a final matrix from the normalized weight vectors; and calculating final antenna weight vectors for the IT antenna array and the IR antenna array from the final matrix.

25. The method of claim 23, wherein each group of antennas of the tag array utilizes a different modulation technique to modulate a carrier signal.

26. The method of claim 23, wherein each group of antennas of the tag array utilizes different data streams to modulate a carrier signal.

27. A smart reflection antenna system comprising:

means for simultaneously transmitting a carrier signal to a tag from multiple antennas;

means for simultaneously receiving the carrier signal from an interrogator transmitter (IT);

means for modulating the carrier signal into a modulated carrier signal;

means for simultaneously transmitting the modulated carrier signal to an interrogator receiver (IR); and means for simultaneously receiving the modulated carrier signal from the tag via multiple antennas of the IR.

28. The system of claim 27, further comprising means for determining information regarding a communication channel between the IT and the IR.

29. The system of claim 28, wherein the means for determining comprises:

means for determining a product channel matrix between an IT antenna array of the IT and an IR antenna array of the IR, wherein the product channel matrix is the product of a matrix of complex channel gains between the IT antenna array and a tag antenna array of the tag and a matrix of complex sideband channel gains between the tag antenna array and the IR antenna array; and means for calculating antenna weight vectors for the IT antenna array and the IR antenna array from the product channel matrix.

30. The system of claim 29, further comprising means for controlling the weights of antennas of the IT antenna array with the calculated antenna weight vectors, such that the signal-to-noise ratio (SNR) is maximized for the modulated carrier signal.

31. The system of claim 28, further comprising means for communicating the information between the IT and the IR.

32. The system of claim 27, wherein the modulated carrier signal is a carrier signal that is transmitted from the IT, backscatter modulated, and transmitted to the IR.

* * * * *